UNITED STATES PATENT OFFICE.

PETER E. HIGHMARK, OF DULUTH, MINNESOTA.

ROTARY INTERNAL-COMBUSTION ENGINE.

1,291,884.

Specification of Letters Patent.  Patented Jan. 21, 1919.

Application filed January 21, 1918. Serial No. 212,916.

*To all whom it may concern:*

Be it known that I, PETER E. HIGHMARK, a citizen of the United States, residing at Duluth, in the county of St. Louis and State of Minnesota, have invented certain new and useful Improvements in Rotary Internal-Combustion Engines, of which the following is a specification, reference being had therein to the accompanying drawing.

This invention relates to internal combustion engines and has special reference to that type known as rotary multi-cylinder engines and in which all of the piston rods are connected with the same crank, the cylinders revolving about the crank shaft in one direction and the shaft rotating in the opposite direction when the engine is in operation.

A further peculiarity of the engine herein disclosed is that the crank shaft is vertically disposed and the cylinders revolve about same in a horizontal plane, the novel structure and combination of parts herein claimed being applicable particularly to this type of engine.

The principal object is to produce a practical engine of this character of as light and efficient design as possible having in mind complying with the requirements demanded by aerial navigation and the like.

Another object is to provide an engine of this type in which the matter of lubrication may be satisfactorily solved.

Still other objects and advantages of the novel construction will appear in the further description thereof.

In the accompanying drawings forming a part of this application and in which like reference characters indicate like parts:

Figure 1:
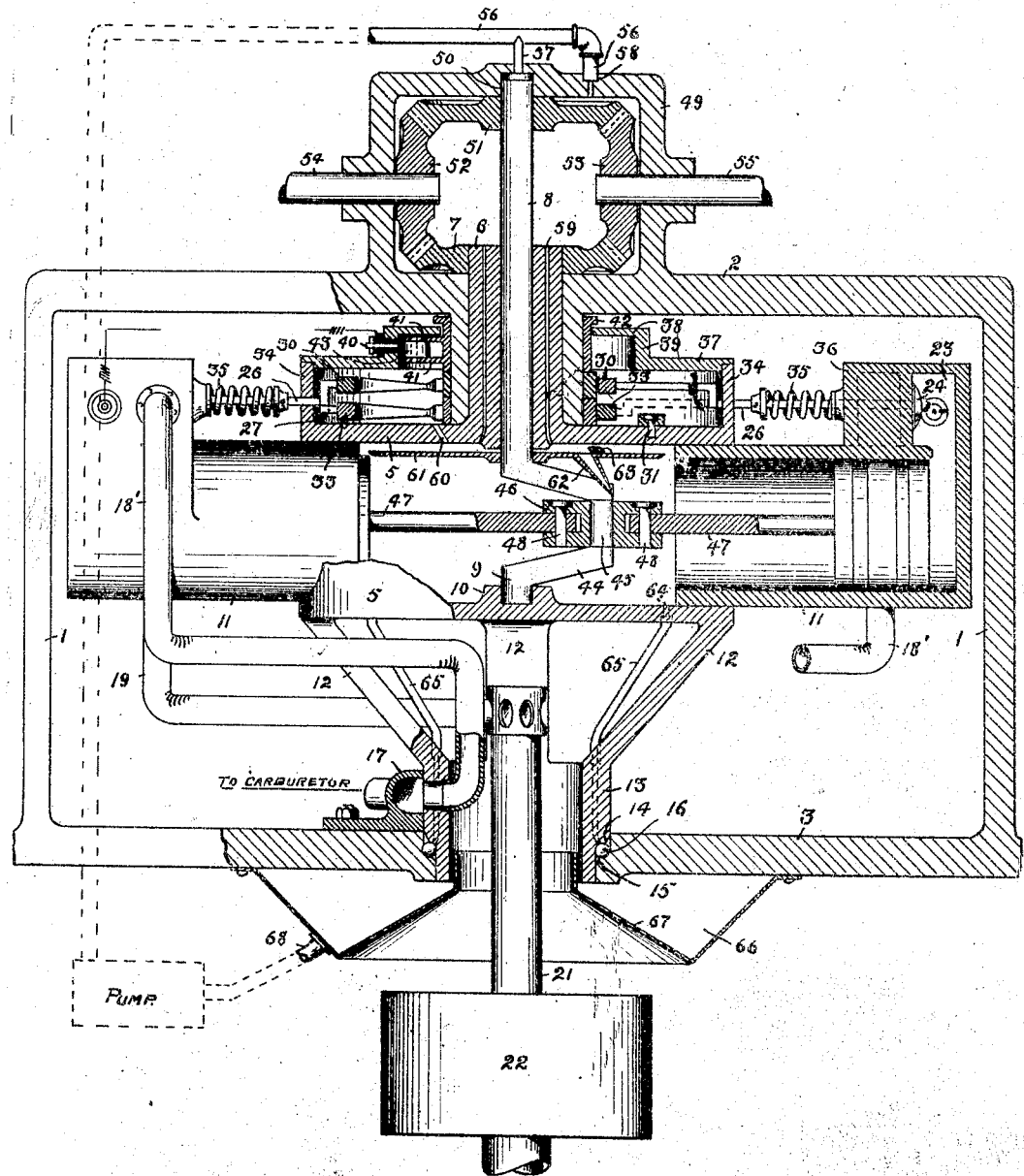
Figure 1 is a vertical central sectional view of an engine embodying my invention.
Figure 2:
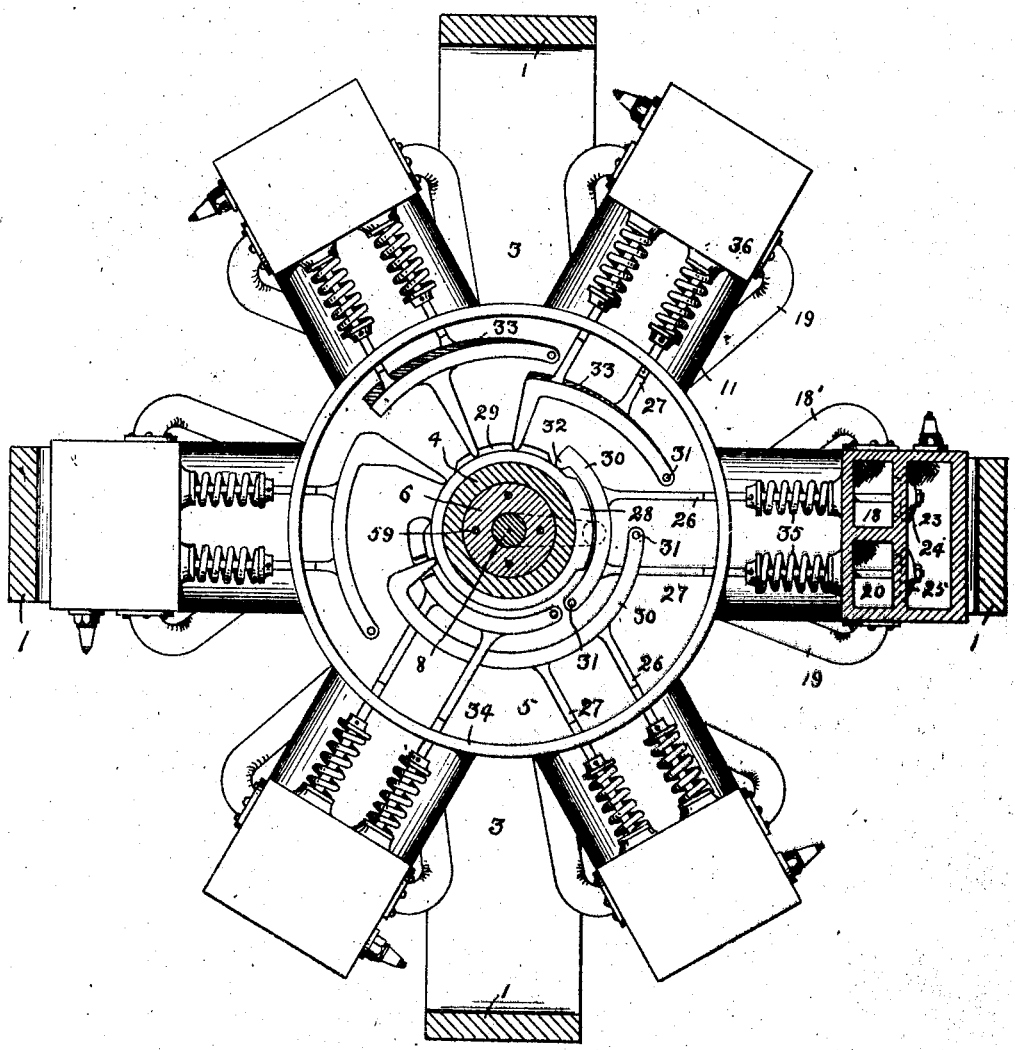
Fig. 2 is a top plan view partly in section of a fragmental portion of the engine showing the arrangement of cylinders and valve operating mechanism.
Figure 3:
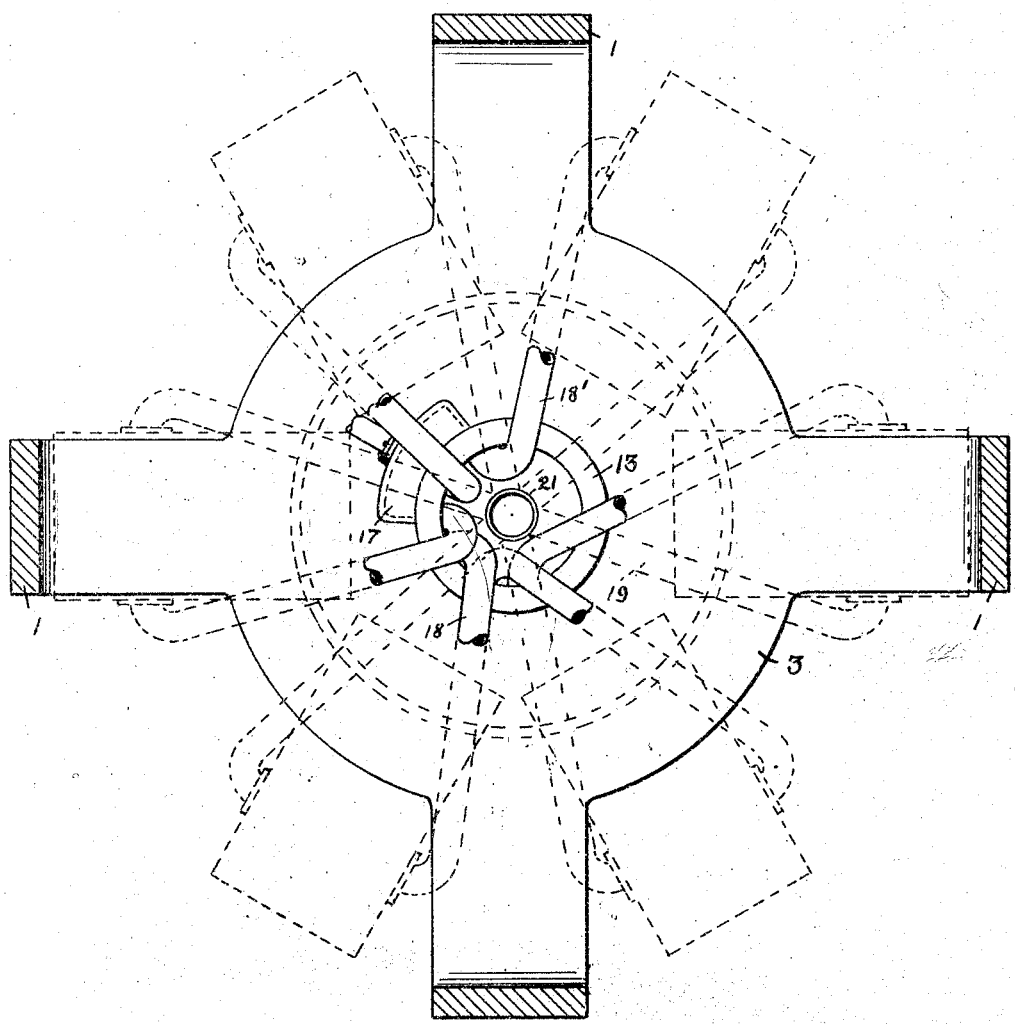
Fig. 3 is a diagrammatic view showing the arrangement of intake pipes and their relation to the carbureter.

In the embodiment of the invention here illustrated 1 represents the vertical walls or members of the supporting frame of the engine which may be of any desired construction or form to suit individual circumstances, however, preferably of as open construction as possible to allow free circulation of air about the moving parts of the engine which is known to be essential in the operation of such.

2 represents the upper wall or top of the supporting frame and 3 the lower wall or base.

This frame may be supported in any desired manner and forms the fixed portion of the engine in which the moving parts are mounted.

A centrally positioned depending hub or sleeve 4 is formed integral with the upper wall 2 of the supporting frame and acts as a bearing for the crank case 5 which has a wrist 6 extending within the sleeve to a point above the upper face of the wall 2 and to which the beveled gear 7 is fixed for transmitting power from the rotating crank case.

The wrist 6 has a central axial bore therethrough in which the upper end 8 of the crank shaft is journaled, the lower stub end 9 of the crank shaft being journaled in an upstanding boss 10 formed integral with the lower wall of the crank case.

The crank case is circular in plan view and the upper and lower end walls are spaced apart a distance just equal to the diameter of the engine cylinders 11 which extend radially into the crank case through the circumferential wall thereof, the cylinders being spaced equidistant thereabout and I have shown six such cylinders in the embodiment here illustrated.

The cylinders may be secured within the crank case in any desired manner either by being screw threaded therein or bolted thereto as desired.

The supporting portion of the crank case comprises a plurality of legs 12 either formed integral therewith or suitably attached thereto and I have shown four such legs as being a convenient number for the purpose.

These legs converge downwardly from the crank case and terminate in a comparatively heavy annular ring 13. This ring has formed in the outer lower corner thereof a ball bearing race or seat as at 14 which registers with a similar seat 15 in the edges of the hole in the base 3 of the supporting frame for the reception of the lower end of the ring 13. Balls 16 are established within such bearing thus supporting the crank case and cylinders on a substantial and as frictionless a bearing as possible.

The discharge port or chamber 17 of the carbureter not shown is of arcuate shape and having its face fitting closely against the circumferential wall of the ring 13 presents at all times to the outer face of the ring an elongated opening through which the gas is taken by the intake pipes 18 leading to each cylinder. The ends of these intake pipes terminate in the inner side walls of the ring in which there are registering holes therefor and are arranged radially in their proper places to receive the charge of gas at the right time during the cycle of each piston.

The chamber 17 may be fixed to the base 3 of the frame in any desired manner and the carbureter may be adjacent thereto or wherever desired.

The intake pipes 18' preferably lead up from their connection to the ring 13 adjacent the bottom of the crank case and from thence radially out toward each respective cylinder, and up to the intake chambers 18 of the cylinders.

The exhaust pipes 19 lead from the exhaust chambers 20 on the opposite sides of cylinders to that of the intake chambers and pipes and down in a similar manner to that of the latter and connected to the upper end of the centrally disposed manifold pipe 21 which may have an exhaust muffler 22 installed therein beneath the base of the supporting frame. The exhaust manifold and muffler are designed to rotate with the engine.

The intake chamber 18 and exhaust chamber 20 are made to communicate alternately with the combustion chamber 23 by the reciprocal valves 24 and 25 which are common in such engine construction. However, the manipulation of the valves is somewhat novel in that the stems 26 and 27 thereof respectively are operated in one direction by engagement with stationary cams 28 and 29 fixed to the sleeve 4 of the supporting frame, 28 operating the intake valves and 29 the exhaust valves.

The stem 26 is attached substantially centrally to a horizontally actuated arcuately shaped dog 30 pivotally mounted at 31 to the upper wall of the crank case said dog having an inwardly protruding nose 32 which is engaged by the cam 28 as the crank case and cylinders are revolve thereabout.

A similar dog 33 is mounted below the dog 30 and upon the same pivot 31, this dog being connected to the stem 27 and operating the exhaust valve, it being engaged in a manner similar to the dog 30, by the cam 29.

As is evident there are a pair of dogs for each cylinder, however, necessarily of somewhat different shape and length in order to engage the cams at the proper moment and to compensate for the simultaneous revolving of the cylinders and rotation of the crank shaft.

An annular upstanding flange 34 is shown as formed integral with the upper wall of the crank case and through which the valve stems operate, it acting as a guide and support for same.

Expansive spiral springs 35 are shown as surrounding each valve stem intermediate of the valve chest 36 and the flange 34 said springs being so arranged as to normally hold the valves closed, such being common in the art.

As an operative ignition device I have shown the flange 34 as carrying a covering plate 37 with a hublike central portion 38 having a vertically disposed annular wall 39 in which the contact points 40 are properly arranged they being electrically connected to their respective spark plugs as is well understood.

Within the hublike portion 38 and carried between suitable brackets 41—41 extending radially from the adjustable sleeve 42 is the contacting roller 43 which bears at all times against the inner surface of the wall 39 and closes the various electric circuits to the spark plugs when engaging the contact points 40.

The sleeve 42 is made rotatably adjustable about the sleeve 4 upon which it is mounted to permit of retarding or advancing the spark by such adjustment which may be accomplished in any desired manner, it being properly connected within the ignition circuit.

While I have shown these specific forms of valve and ignition controlling means, it is to be understood that the invention is not confined to such as various modifications may be resorted to without departing from the spirit of the invention.

44 represents the crank of the shaft 8—9 and as is customary in such devices, is an integral part thereof. About the wrist pin 45 of the crank is a circular cross head 46 to which all of the piston rods 47 of the various cylinders are pivotally attached as at 48. By this arrangement, as the cylinders and crank case revolve about the shaft in one direction, the latter rotates in the opposite direction, this combination of action being old in the art.

To govern the relative speed of the shaft and the casing I have provided the arrangement of intermeshing beveled gears above the center of the engine as clearly seen in Fig. 1.

A supporting structure, or housing 49 which may or may not be an integral part of the principal supporting frame is made to span the central portion of the engine and in which both the driving and driven shafts are journaled.

The upper end 8 of the crank shaft is journaled in the top portion of the housing 49 as at 50 and carries adjacent such portion and securely fixed thereto a beveled gear 51 which is identical with the gear 7 fixed to the sleeve of the crank case.

Intermediate of these gears, upon opposite sides and meshing therewith are two beveled gears 52 and 53 they being identically alike and designed to convey the power and motion imparted to them from the crank shaft and the crank casing to their respective shafts 54 and 55 which extend outwardly through opposite sides of the housing 49, but as is evident these two shafts will rotate in opposite directions.

In the utilization of power from this engine it may be found preferable to have one of these shafts larger and stronger than the other for transmitting the major portion of the power and the other smaller and used only for operating certain portions of the engine mechanism such as a governor, magneto or the like which will be understood by those versed in the art.

As an oiling system for this form of engine and which is made a coöperative part of the novel construction and that such engine may be successfully operated, I have shown at 56 an oil supply pipe which feeds oil both to the top of the crank shaft 8—9 and into the housing 49.

The branch pipe 57 which feeds oil to the end of the crank shaft is comparatively small while the end of the pipe 56 leads directly into the housing 49 as at 58 and is designed to furnish a continuous supply of oil on and about the beveled gears and their journals in the walls of the housing.

Oil holes 59 are formed through the gear 7 and lengthwise through the wrist 6 into the crank case. Some oil will also work down through the bearing between the sleeve 4 and wrist 6 and enter the cam case or inclosure surrounded by the annular flange 34. From there into the crank case are provided oil holes 60.

Both these holes and the holes 59 discharge upon a thin circular disk 61 securely fixed to the crank shaft just above the crank 44.

Just above and adjacent the crank 44 is formed in the disk an inclined spout 62 which discharges oil from the upper surface of the disk directly into the bearing in the cross head 46 and about the wrist pin 45. Sufficient of the oil thus discharged will be spread about on the cross head to lubricate the piston rod connections therewith.

I have illustrated an upwardly inclined diverting shield 63 formed on the disk 61 just outside of the entrance to the inclined spout 62 for the purpose of directing a larger proportion of oil into the spout than otherwise would occur.

All the remainder of the oil received upon the disk will be discharged by centrifugal action from the edges thereof on to the pistons of the cylinders and into the open ends of the cylinders thoroughly lubricating them at all times when the engine is in operation.

In the bottom of the crank casing I have shown a plurality of oil holes 64 adjacent the ends of the cylinders and of which there may be any desired number.

These holes discharge into conductor pipes or tubes 65 leading down to the top of the bearing ring 13 in which there are vertical oil holes leading to the ball bearing in the lower end of the ring and upon which the engine is supported.

A circular oil basin 66 surrounds the lower portion of the ball bearing and is fixed to the under face of the base 3 of the supporting frame.

This basin has an upwardly extending somewhat conically shaped central portion 67 extending within the ring 13 and around the exhaust manifold 21 for the purpose of diverting the oil into the annular trough-like basin thus formed.

From this basin the oil is preferably conducted by a suitable pipe 68 to a pump or other means for returning it to the place of first entry into the engine, thus forming a continuously circulating oil system.

The pump is only suggestively illustrated as such as the patricular form thereof is not material to my present invention.

What I claim is:

1. In combination a multi-cylinder horizontally revoluble engine, power transmitting means centrally positioned upon the uppermost face of the engine and continuous oil feeding means whereby the oil is first fed to the power transmitting means and thence through the entire engine to the lowermost face thereof from whence it is discharged.

2. In combination a multi-cylinder horizontally revoluble engine, power transmitting means centrally positioned upon the upper face of the engine, oil feeding means entering first adjacent the power transmitting means and thence passing by gravity through the entire engine.

3. In combination a multi-cylinder horizontally revoluble engine, power transmitting means above the engine, a housing about the power transmitting means and oil feeding means attached to the housing whereby oil is fed first to the transmitting means and thence by gravity through the entire engine.

4. The combination with an engine of the character described including an inclosed crank case, an inclosed gear case above the crank case and a bearing upon which the entire engine revolves, of means for admitting oil into the gear case, means for permitting oil to pass unobstructedly from the gear case to the crank case, means within the crank case for distributing the oil centrifugally therein and means for conveying oil from the crank case to and through said bearing substantially as described.

5. An engine of the character described, comprising a stationary supporting frame, a horizontally revolving crank case carried in the frame and extending above same, a beveled gear fixed to said extension, a plurality of radially disposed cylinders fixed to the crank case, a crank shaft operatively connected with each cylinder and extending upwardly through and beyond the extension of the crank case, a beveled gear fixed to the upper end of the crank shaft, a housing surrounding the gears and the upper end of the shaft, a shaft extending through one side of the housing, a beveled gear fixed to the inner end of said shaft, meshing with the two first mentioned gears and driven thereby, a shaft extending through the opposite side of the housing, a beveled gear fixed to the inner end of said shaft, meshing with the two first mentioned gears and driven thereby whereby power is transmitted to both horizontal shafts from the crank case and crank shaft, they operating in opposite directions.

6. The combination with a structure as set forth in claim 5, of a feed discharge chamber fixed to the stationary support and a feed pipe for each cylinder progressively communicating with the feed chamber.

7. The combination with a structure as set forth in claim 5, of a feed discharge chamber fixed to the stationary support, a feed pipe from each cylinder progressively communicating with the chamber, a depending exhaust manifold rotating with the engine and an exhaust pipe leading from each cylinder and communicating with the manifold.

In testimony whereof I have hereunto affixed my signature in the presence of two witnesses.

PETER E. HIGHMARK.

Witnesses:
 ALGOT JOHNSON,
 S. GEO. STEVENS.